No. 736,927. PATENTED AUG. 25, 1903.
C. H. BICALKY.
BUSHING FOR SPLIT PULLEYS.
APPLICATION FILED MAY 5, 1902.
NO MODEL.
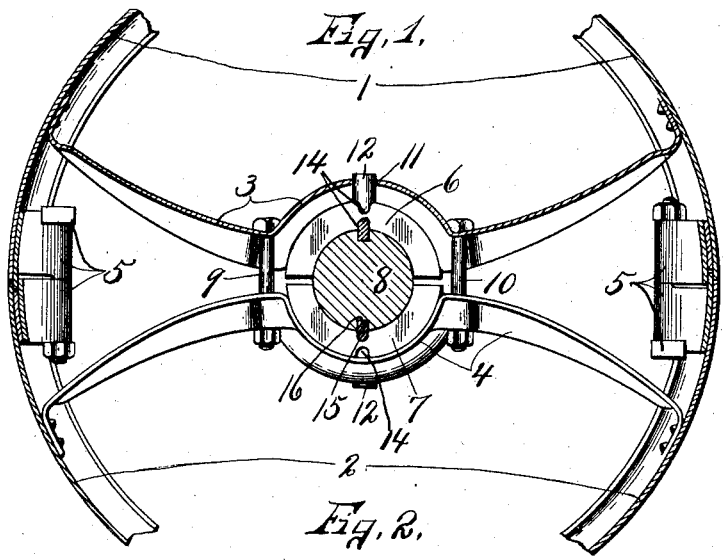
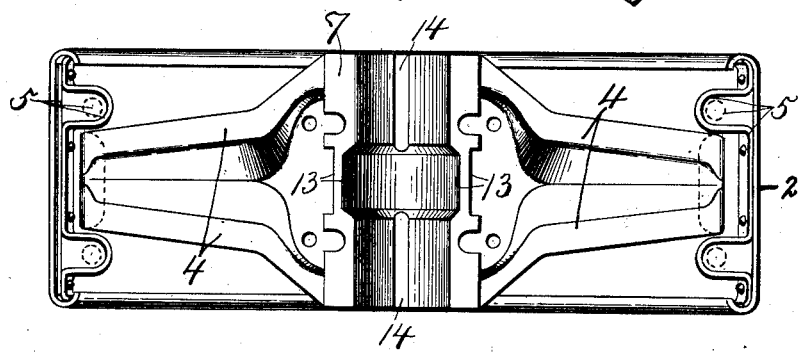
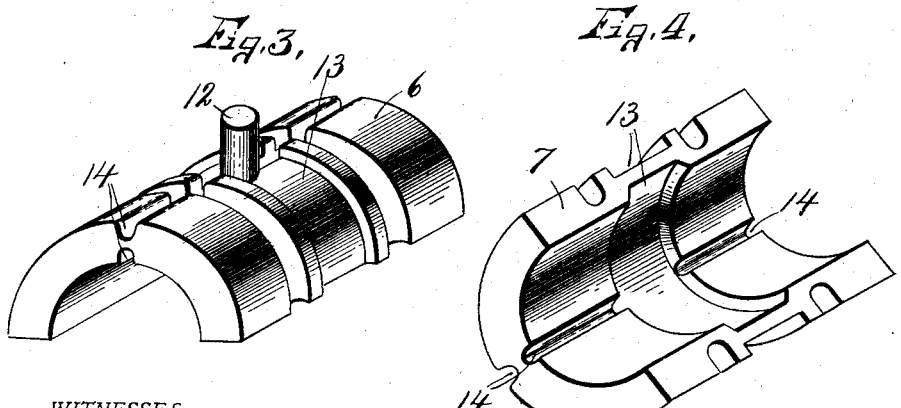
WITNESSES:
INVENTOR
Charles H. Bicalky
BY
Smith & Davidson
ATTORNEYS.

No. 736,927.

Patented August 25, 1903.

UNITED STATES PATENT OFFICE.

CHARLES H. BICALKY, OF ONEIDA, NEW YORK.

BUSHING FOR SPLIT PULLEYS.

SPECIFICATION forming part of Letters Patent No. 736,927, dated August 25, 1903.

Application filed May 5, 1902. Serial No. 105,981. (No model.)

*To all whom it may concern:*

Be it known that I, CHARLES H. BICALKY, of Oneida, in the county of Madison, in the State of New York, have invented new and useful Improvements in Bushings for Split Pulleys, of which the following, taken in connection with the accompanying drawings, is a full, clear, and exact description.

My invention relates to improvements in bushings for split pulleys, having reference more particularly to the means for clamping the pulley to the shaft.

One of the objects of this invention is to provide a split bushing which is recessed circumferentially and axially in such manner as to form independently-movable jaws at the ends of the meeting edges of the bushing, whereby the end and meeting edges of the bushing are caused to firmly grip the shaft under light pressure of suitable clamping bolts or screws.

Another object is to utilize one or more of the axial recesses or grooves as keyways to be used in combination with a key and a key-seat of a shaft whereby one or both of the bushing-sections may be locked to the shaft.

A further object is to provide each of the bushing-sections with means for interlocking with the hub of the pulley, and a still further object is to provide suitable brace-bars which tie the opposite ends of the rim-sections together and coöperate with the bushing-sections and suitable clamping-bolts to lock the rim to the shaft.

To this end the invention consists in the combination, construction, and arrangement of the parts of a pulley, as hereinafter fully described, and pointed out in the claims.

Referring to the drawings, Figure 1 is an end elevation, partly in section and partly broken away, of a split pulley embodying the features of my invention. Fig. 2 is an inner face view of one-half of the pulley seen in Fig. 1. Figs. 3 and 4 are perspective views showing the opposite faces of the bushing-sections.

Similar reference characters indicate corresponding parts in all the views.

In the drawings I have shown opposite cylindrical rim-sections 1 and 2; braces or tie bars 3 and 4, connecting corresponding ends of the semicylindrical rim-sections; clamps 5, uniting the meeting edges of the rim-sections; bushing-sections 6 and 7, interposed between the central portions of the braces 3 and 4, and shaft to engage a shaft 8, and clamping-bolts 9 and 10 for compressing the central portions of the braces 3 and 4, and thereby forcing the bushing-sections into engagement with the shaft.

The rim-sections 1 and 2 may be of any desired form, size, or material adapted for various purposes for which a wheel or pulley is used, but are preferably formed of sheet metal of the construction set forth in my pending application, Serial No. 89,525, filed January 13, 1902. These rim-sections are arranged with their periphery in the same circumferential plane and with their meeting edges in close contact, said meeting edges being held in such position by the clamps 5, which form the subject-matter of a companion application, and it is therefore unnecessary to further illustrate or describe this rim and the means for clamping its meeting edges together.

The braces 3 serve as tie-bars between the corresponding ends of the opposite half-sections of the rim, and while they are adapted to stiffen the meeting ends of the opposite half-sections of the rim and to relieve the strain upon the clamping members at said meeting edges their primary function is to coöperate with the bushing-sections and clamping-bolts 9 and 10 to secure the pulley to the shaft 8. These brace-bars 3 and 4 are formed of sheet metal for the purpose of reducing the weight of the pulley, but mainly for the purpose of permitting the central portions to yield readily under the draft of the clamping-bolts 9 and 10, the central portions of said brace-bars being arched in opposite directions for forming a suitable split hub, the opposite halves of which partially inclose or encircle the adjacent bushing-sections 6 and 7. In order that the best possible gripping effect may be produced by drawing the intermediate portions of the brace-bars together, said intermediate portions are also arched in opposite directions outwardly and axially or transversely, by which construction the opposite ends of the hub-sections engage the opposite ends of the bearing-sections 6 and 7. Each of these brace-bars or hub-sections is provided with a substantially central aperture 11, which receive lugs or projections 12, formed upon the central portions of the peripheries of the bushing-sections in alinement with the outer axial recess, whereby the bushing-sections and hub are firmly locked from independent rotary movement one upon the other. Each of these bushing-sections 6 and 7 is provided with circumferential and axial recesses 13 and 14, the circumferential recesses 13 being formed in the inner and outer surfaces of each section for the purpose of permitting the opposite ends of the bushing to yield under pressure when the same are clamped upon the shaft, and the axial recesses are formed in both the inner and outer surfaces of the bushing-section at substantially its central portion, whereby the opposite longitudinal meeting edges may be sprung inwardly to engage the shaft when the hub-sections are drawn together by the clamping members 9 and 10.

It is apparent by reducing the thickness of the central portions of the bushing-sections both circumferentially and axially the opposite ends and the meeting edges of said sections constitute gripping-jaws for engaging the shaft and firmly locking the bushing thereto.

It is sometimes desired to further insure the positive lock between the bushing-sections and the shaft, and I therefore utilize one or both of the inner axial recesses 14 as a keyway for receiving a key 15, which is seated in a keyway 16 on the shaft 8.

The clamping-bolts 9 and 10 are passed through apertures formed in the brace-bars 3 and 4 at opposite sides of the meeting edges of the bushing-sections 6 and 7, these clamping-bolts being preferably arranged in pairs—one pair at each end of the bushing—so that as the intermediate portions of the brace-bars 3 and 4 are drawn together the ends of the bushing-sections are sprung into engagement with the shaft, and at the same time the inner corners of said bushing-sections are also sprung into engagement with the shaft to more firmly lock the same thereto.

The operation of my invention will now be readily understood upon reference to the foregoing description and the accompanying drawings, and it will be noted that some change may be made in the detail construction of the bushing and its clamping means without departing from the spirit of this invention.

Having thus described my invention, what I claim, and desire to secure by Letters Patent, is—

1. A sectional bushing for split pulleys, said bushing having circumferential and axial recesses, one of the axial recesses forming a key-seat.

2. A sectional bushing for split pulleys, said bushing having circumferential and axial recesses, one of the axial recesses forming a key-seat and both sections being provided with lugs in alinement with the other axial recess for the purpose described.

3. A sectional bushing for split pulleys, one of said sections having an inner axial recess forming a key-seat, each of said sections having an outwardly-projecting lug, in combination with a split hub having an aperture receiving the lug, the lug and key-seat of the bushing being in axial alinement.

In witness whereof I have hereunto set my hand this 17th day of April, 1902.

CHARLES H. BICALKY.

Witnesses:
JOSEPH BEAL,
JOSEPH M. PALMO.